W. H. Lanham,
Cultivator.

No. 92,845.          Patented July 20. 1869.

Witnesses
F. H. Lehmann
J. M. Stoops

Inventor
W. H. Lanham
Per Alexander & Mason
Atty

UNITED STATES PATENT OFFICE.

WILLIAM M. LANHAN, OF NOBLESVILLE, INDIANA.

IMPROVEMENT IN PLOWS.

Specification forming part of Letters Patent No. 92,845, dated July 20, 1869.

*To all whom it may concern:*

Be it known that I, W. M. LANHAN, of Noblesville, in the county of Hamilton, and in the State of Indiana, have invented certain new and useful Improvements in Plows; and I do hereby declare that the following is a full, clear, and exact description thereof, reference being had to the accompanying drawings, and to the letters of reference marked thereon, making a part of this specification.

The nature of my invention consists in the construction of a plow, and in the arrangement of the devices hereinafter set forth and described.

Figure 1:
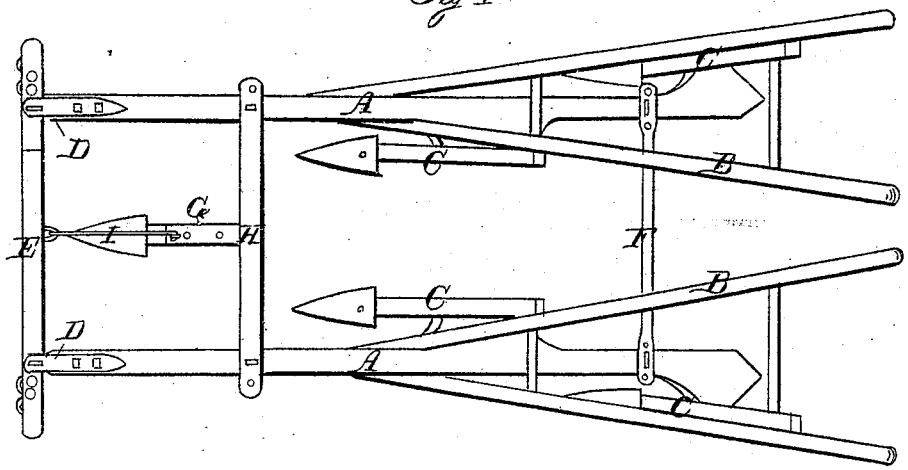
Figure 2:
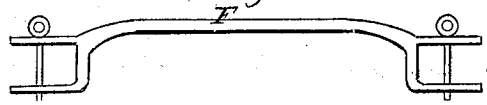
Figure 3:
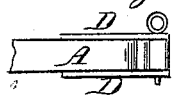

Figure 1 is a plan view of my invention. Fig. 2 is a side view of the pronged bar used in coupling the frame together. Fig. 3 is a side view of the ends of the beams, showing the manner in which they are fastened together.

Letter A represents the two principal beams which form the frame, and to which are secured the handles B and plows C. Upon the front ends of these beams, above and below, are placed the metal plates D, which extend over and are loosely pivoted to the cross-piece E. Extending across at the rear end is the bar F, the ends of which are formed into prongs, which pass above and below the beams, and are then secured by bolts or pins, passing through in such a manner as to allow the frame to be changed from right to left by a simple movement of the handles. Both the cross-piece E and this bar F have a number of holes in their ends, so that the pins can be withdrawn and the beams moved nearer to or farther from each other.

When I desire to use the plow as a harrow, an additional plowshare, G, is added, which comes just in the middle of the beams A.

Extending across the frame is a cross-piece, H, to which the plow G is secured. The ends of this cross-piece are loosely pivoted to the beams, and have several holes made in them, so that the beams can be altered and swung from right to left. Extending back from the cross-piece E is the brace I, which is connected to the plow G, so as to strengthen it.

Having thus described my invention, what I claim, and desire to secure by Letters Patent, is—

1. The cross-piece H, formed of a metal plate, in combination with the plow G and beams A, when used to change the plow into a harrow, substantially as set forth.

2. The pronged bar F, in combination with the plates D, for hinging the beams A together, substantially in the manner and for the purpose set forth.

3. The plates D, bar F, plows C and G, cross-pieces E and H, and brace I, when all are arranged and combined in the manner and for the purpose set forth.

In testimony that I claim the foregoing I have hereunto set my hand this 17th day of April, 1869.

WM. M. LANHAN.

Witnesses:
S. K. CHRISTY,
JOSEPH MYERS.